United States Patent [19]

Auer

[11] Patent Number: 4,627,508

[45] Date of Patent: Dec. 9, 1986

[54] STEP-NEGOTIATING VEHICLE

[76] Inventor: Peter Auer, Ausserdorf 3,, 8479 Truttikon, Switzerland

[21] Appl. No.: 680,476

[22] Filed: Dec. 11, 1984

[30] Foreign Application Priority Data

Dec. 12, 1983 [CH] Switzerland .................. 6618/83

[51] Int. Cl.⁴ .................. B60B 5/02; B62D 55/02
[52] U.S. Cl. .................. 180/9.22; 180/8.2; 280/5.22; 280/5.28
[58] Field of Search .......... 180/8.2, 9.22, 907; 280/5.22, 5.24, 5.26, 5.28, DIG. 10

[56] References Cited

U.S. PATENT DOCUMENTS

| | | | |
|---|---|---|---|
| 1,591,529 | 7/1926 | Guerber | 280/DIG. 10 |
| 3,178,193 | 4/1965 | Grogan | 280/5.26 |
| 3,226,128 | 12/1965 | Grier | 280/DIG. 10 |
| 4,033,421 | 7/1977 | Ikarimoto | 180/8.2 |
| 4,401,178 | 8/1983 | Studer | 180/8.2 |
| 4,432,426 | 2/1984 | Misawa | 180/9.22 X |

FOREIGN PATENT DOCUMENTS

52-44933  8/1977  Japan .................. 280/DIG. 10
463235  3/1937  United Kingdom .......... 280/5.26

*Primary Examiner*—John A. Pekar
*Attorney, Agent, or Firm*—Gifford, Groh, VanOphem, Sheridan, Sprinkle and Dolgorukov

[57] ABSTRACT

A step-negotiating vehicle comprises a low-level chassis structure with motor-driven tracks, for carrying a load such as a wheelchair. The vehicle is provided with an extension support means to increase the support area defined by the track assembly, which is limited by the dimensions of the chassis structure, thereby to enhance stability of the vehicle. Associated with the respective tracks are support rollers for supporting and moving the vehicle when travelling on at least substantially level ground. The arrangement of the support rollers is such that, after the vehicle has negotiated steps, the rollers automatically come into operation on reaching the horizontal ground, without intervention on the part of the person using the vehicle, whereby the vehicle is supported on the rollers, without, however, the rollers interfering with movement of the vehicle up or down steps.

30 Claims, 9 Drawing Figures

STEP-NEGOTIATING VEHICLE

BACKGROUND OF THE INVENTION

Difficulties are often encountered when loads are to be transported up or down steps or stairs, which in some cases may be steep, as well as on flat or at least generally flat surfaces. Such difficulties are not confined to transporting items or materials under such circumstances, but similar difficulties occur in regard to transporting a wheelchair for a handicapped person who wishes to negotiate steps or stairs. In an effort to deal with such a difficult situation, a step-negotiating vehicle has been developed, comprising a chassis structure of low height, which is adapted to fit under a wheelchair or to carry a load thereon. The chassis structure is provided with fixing means for securing the wheelchair in position thereon, and carries a support and drive means comprising tracks which are passed around suitable rollers and guides, with at least one of the rollers for each track being drivable by means of a motor. Such a track-laying, step-negotiating vehicle (see U.S. Pat. No. 4,401,178) is provided with a fixing means in the form of an attachment or adaptor which is so designed as to engage a wheelchair which is disposed on the top of the chassis structure, thereby to permit the wheelchair with its occupant to be transported in safety. In that vehicle, as mentioned above, the motor-driven tracks pass around a respective sliding guide assembly which is rigid along the line of the lower run of the tracks where they engage the ground, with the end portion of the guide arrangement being curved up at one end, where the track extends around a guide or drive roller. Each track may also be passed around a star-like roller member adapted to provide the necessary guiding and driving action. In the region of the upwardly curved end portion of the track guide means, the chassis structure carries transport rollers which are arranged to engage the ground in such a way as to lift the adjacent portion of the tracks away from the ground so that when the vehicle is travelling on a substantially flat surface, the vehicle is not driven by way of the motor-driven tracks, but simply rolls along on the transport wheels. In order for the vehicle to be operated in that situation, on an at least substantially horizontal surface, the rollers are fitted into the side of the chassis structure or have to be lowered on to the ground by means of foot rest members.

However, the step-negotiating, track-laying vehicles of the kind indicated above, which are intended in particular for carrying a wheelchair, must be of narrow track or gauge so that the chassis structure with the driven tracks can be fitted into position under the wheelchair, within the narrow space available between the wheels of the wheelchair structure. The narrow track or gauge of the vehicle means that it tends to suffer from a lack of lateral stability, which is obviously a very serious difficulty when the vehicle is to be used for transporting a handicapped person in a wheelchair. In addition, in order to negotiate steep steps or stairs, the length of the tracks must be relatively great in order to provide sufficient stability in a fore-and-aft direction, and in order to prevent the vehicle with the wheelchair and its occupant from tipping forward, for example when going down a steep flight of steps. However, the substantial track length means that the maneuverability of the vehicle on a substantially flat surface is considerably impaired. Difficulties are encountered in attempting to find a satisfactory compromise between a track length which is sufficiently short to permit easy maneuverability of the vehicle while at the same time ensuring suitable stability in the fore-and-aft direction. Furthermore, the transport or support rollers which can be fitted to the chassis structure in order for the vehicle to move on a generally horizontal surface are troublesome in use because they must be removed in order for the vehicle to negotiate stairs or steps. A construction whereby the rollers can be lowered into contact with the ground by means of foot members is fairly complicated and expensive, and causes problems when the steps or stairs to be negotiated comprise two or more flights which are separated as by a landing or a level section since, in negotiating such stairs, the rollers have to be moved into and out of their operative position at each landing or level section, in making the transition between the level section and the adjacent steps or stairs. The correct position for the rollers is generally monitored by electrical means, which constitutes a further complication and possible source of trouble.

SUMMARY OF THE INVENTION

An object of the present invention is to provide a vehicle of simple structure which is capable of negotiating in safety one or more steps, while carrying a load thereon such as a wheelchair or other article or material.

A further object of the present invention is to provide a step-negotiating vehicle which enjoys enhanced stability in comparison with such prior-art vehicles.

Still another object of the present invention is to provide a step-negotiating vehicle capable of use on steep steps and stairways.

Yet another object of the present invention is to provide a stepnegotiating vehicle which is capable of a substantial degree of smoothness and comfort when negotiating steps.

A still further object of the invention is to provide a step-negotiating vehicle which is capable of automatic transition between a level surface and a flight of steps.

These and other objects are achieved by a step-negotiating vehicle, being a vehicle which is capable of moving up or down one or more steps or stairs, comprising a low-level chassis structure having a bottom surface, a top surface and side surfaces, adapted to fit under a wheelchair or to carry an article or articles or material to be loaded thereon. The chassis structure may be provided with fixing means for securing thereon the article, material or wheelchair to be carried on the chassis structure. The chassis structure carries a drive and support arrangement comprising a power source, a drive motor with transmission means, track guide means, drive rollers operatively drivable by the drive motor, and flexible tracks drivable by the drive rollers and guided by the track guide means. In addition, to enhance the stability of the vehicle, at least one extension support means or cantilever assembly is disposed on at least one side or end of the chassis structure, adjacent to the bottom surface thereof, thereby representing additional support for the vehicle and thus enhancing its stability in a longitudinal and/or lateral direction, depending on where the support means projects from the chassis structure. By virtue of the support means being of a suitable configuration, extending laterally at both lateral sides and at least forwardly from the chassis structure of the vehicle, the stability of the vehicle may be substantially enhanced both in a transverse direction and in the longitudinal direction of the chassis structure, as considered forwardly thereof, so that the vehicle is capable of moving up or down steep steps or stairs.

In a preferred embodiment of the invention, the cantilever or extension support means extends from the end of the vehicle which is the leading or front end in the normal direction of movement thereof, thus providing increased support forwardly of the chassis structure, and it carries one or more support rollers on the forwardly projecting portion, so that the vehicle can make an easy transition in going from steps down which the vehicle has been moving, on to a generally flat surface at the bottom of the steps, with the support roller or rollers thus resting on the level surface as the vehicle with its load reaches the bottom of the steps or stairs.

In a further embodiment of the invention, the cantilever or support means is adjustable in respect of length and/or width so that the supporting effect, laterally and/or longitudinally of the chassis structure, can be adapted to the steps or stairs to be negotiated and to the load being transported on the vehicle. That means that the outside dimensions of the vehicle itself can be kept as small as may be required under specific circumstances.

Another embodiment of the invention provides that the extension or cantilever support means is so designed that it can be fitted to and removed from the chassis structure. That design configuration has the advantage that the extension support means can be totally eliminated under appropriate circumstances, which is also advantageous in regard to loading the vehicle.

In a more developed embodiment in accordance with the present invention, the track guide means at respective sides of the chassis structure each have a bent portion which extends upwardly away from a generally rectilinear portion against which the lower run of the respective track bears. In the region of the upwardly bent portion of the track guide means, the chassis structure carries a roller assembly which operates automatically, in a manner which will be described hereinafter. The roller assembly comprises roller carrier members which are disposed at respective sides of the chassis structure and which are connected together for example by way of a rigid spindle or shaft, each roller carrier member carrying two support rollers. The roller carrier members are freely rotatable with respect to the chassis structure and thus do not in any way interfere with movement of the vehicle on its tracks, when negotiating steps or stairs. The arrangement of the roller assembly with the shaft or spindle disposed between each two rollers on a respective carrier member has the advantage that the vehicle is always automatically supported on the rollers which project beyond the lower run of the tracks, when the vehicle is standing on a substantially horizontal plane, so that the vehicle can be easily maneuvered by virtue of resting on the rollers, without being driven by way of the tracks. Since the roller assembly takes up that position for maneuvering the vehicle without intervention on the part of the person using the vehicle, that constitutes a considerable simplification in construction and operation of the vehicle. There is also the further advantage that there is no need for electrical monitoring means in the system, and that in turn has cost advantages, together with the simplicity of construction.

In a further embodiment of the vehicle in accordance with this invention, the roller carrier members of the roller assembly are disposed in such a way that they are slightly turned relative to each other about the shaft or spindle to which the roller carrier members are secured, so that for example in the case of one roller carrier member it is the rearward roller that rests on the ground, while in regard to the other roller carrier member it is the front roller that rests on the ground, the weight of the vehicle thus being carried predominantly by the rollers which thus project further downwardly, namely the rearward roller of a pair at one side and the forward roller of the pair at the other side, while the respective other rollers of the respective pairs perform the necessary support function. That arrangement has the advantage that the two-point support effect afforded by the respective rollers which are in contact with the ground make it easier for the vehicle to be turned away or steered, in particular when moving off from a stationary position.

In another embodiment of the vehicle in accordance with the teachings of this invention, which is an alternative to the abovedescribed construction having the roller assembly comprising respective pairs of rollers at each side of the chassis structure, the roller carrier members at each side of the chassis structure each only carry one roller, the roller carriers again being rigidly connected together and being pivotable about the shaft or spindle interconnecting same, that arrangement also permitting the vehicle to be easily moved up and down steps or stairs, without such movement being impeded or hindered by the rollers. In that construction, the roller carriers are fixed in the appropriate position for the vehicle to travel on a substantially horizontal surface, by the connecting shaft or spindle which fixedly interconnects the roller carriers at respective sides of the chassis structure being fixed with respect to the chassis structure, in a position in which the rollers extend downwardly below the bottom run of the tracks thereby to support the vehicle on the rollers. The connecting shaft or spindle may be fixed in the appropriate position by force-locking means, or by positive interengagement, as by one component engaging into another component in such a way that the roller carrier members cannot be displaced out of the position in which the rollers support the vehicle. The roller carrier members desirably move into the operative position of the rollers, automatically when the vehicle moves on to a substantially horizontal plane.

As will be seen in greater detail hereinafter, the vehicle in accordance with the principles of this invention provides a simple and inexpensive structure which gives enhanced stability and safety, which is particularly relevant when a wheelchair with a handicapped person therein is to be carried on the vehicle, while also being simple to use and being versatile in its range of applications and in regard to the surfaces over which it can travel.

Further objects, features and advantages of the present invention will be more clearly apparent from the following description of a preferred embodiment which is given by way of example of the invention.

DESCRIPTION OF PREFERRED EMBODIMENTS

Figure 1:
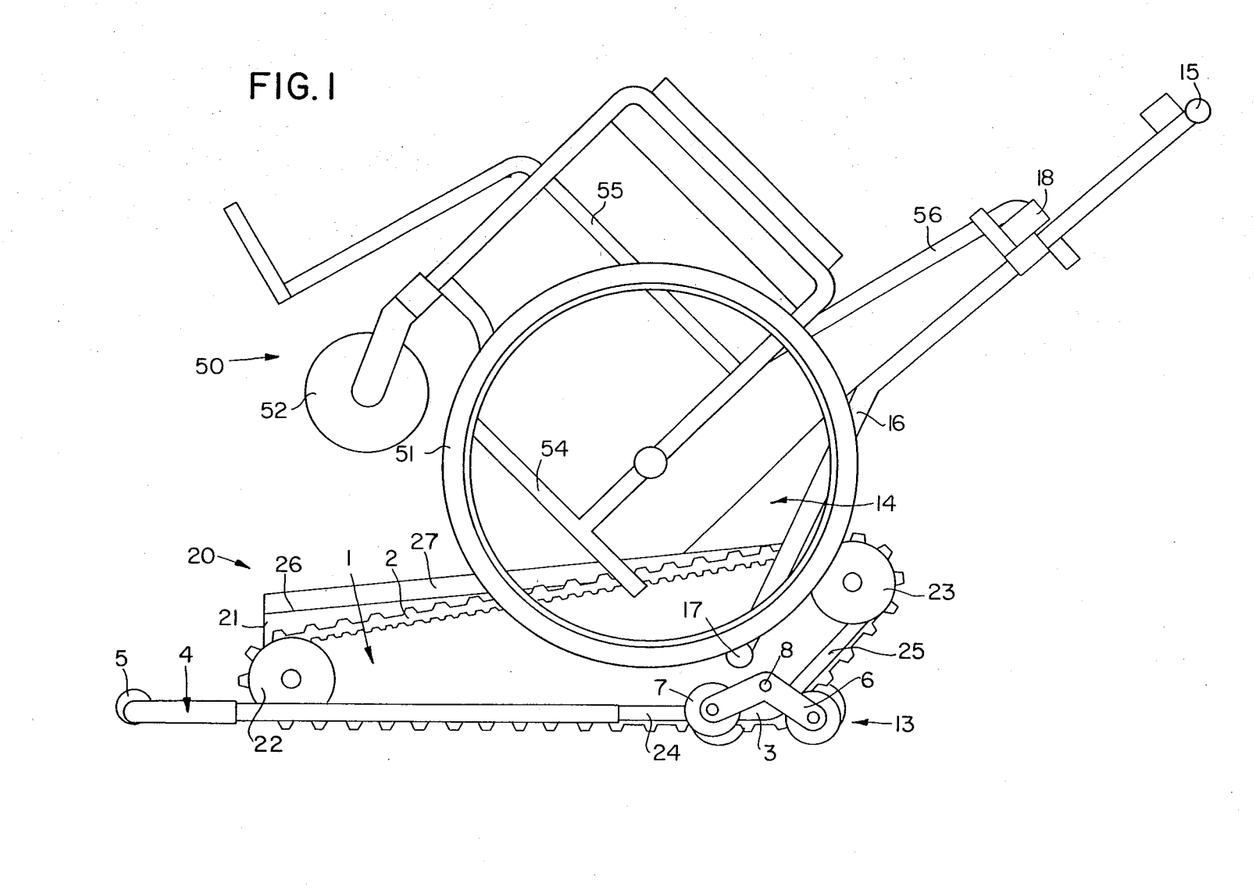
FIG. 1 shows a side view of the vehicle with a wheelchair carried thereon, in the position of readiness for movement of the vehicle, prior to negotiating a stairway.

Referring first to FIG. 1, illustrated therein is a vehicle 20 in accordance with the invention, which is designed to carry a wheelchair as indicated generally at 50. In the usual fashion, the wheelchair 50 has two spaced-apart large wheels 51, two smaller wheels or rollers 52, a frame 54 including a seat 55 and a guide handle or rod assembly as indicated at 56.

The vehicle 20 comprises a narrow chassis 1 which is of low height and which is of such an overall transverse dimension that it can be fitted into the space between the wheels 51 of the wheelchair 50 and under the bottom members of the frame 54 thereof, so that the vehicle 20 can thus be moved into a position beneath the wheelchair 50 for negotiating one or more steps or stairs. The chassis structure 1 of the vehicle 20 has a casing or cladding means 21 within which are suitably disposed an electrical power source such as a battery, an electric motor connected to the battery for operation thereby, and a suitable transmission unit such as a worm transmission, of a general structure as disclosed for example in U.S. Pat. No. 4,401,178, which is hereby incorporated by reference. The chassis structure 1 of the vehicle 20 thus provides a bottom surface, which faces towards the ground, a top surface on which a load may be received and supported, and side surfaces, comprising two oppositely disposed lateral surfaces of which one can be seen in FIG. 1, being a side view of the chassis structure 1, and a leading end surface and a trailing end surface, leading and trailing relating to the usual direction in which the vehicle 20 will move, thus being towards the left in FIG. 1.

At each side of the chassis structure 1, it carries wheels as indicated at 22 and 23 in FIG. 1, the illustrated wheels thus being aligned with corresponding wheels on the other side of the chassis structure 1. At least one pair of associated wheels 22 is drivingly connected to the transmission unit which in turn is driven by the electric motor. At each side of the chassis structure, a track 2 in the form of a rubber belt extends around the wheels 22 and 23, the tracks 2 preferably being provided with suitable means or shaped portions to enhance their grip, as illustrated in the form of teeth or bars (which can be more clearly seen in the plan view in FIG. 3). The surface of each track 2 which is in contact with the wheels 22 and 23 is preferably suitably shaped to engage therewith, in order to provide a non-slip connection between the driving wheel and the respective track.

Figure 2:
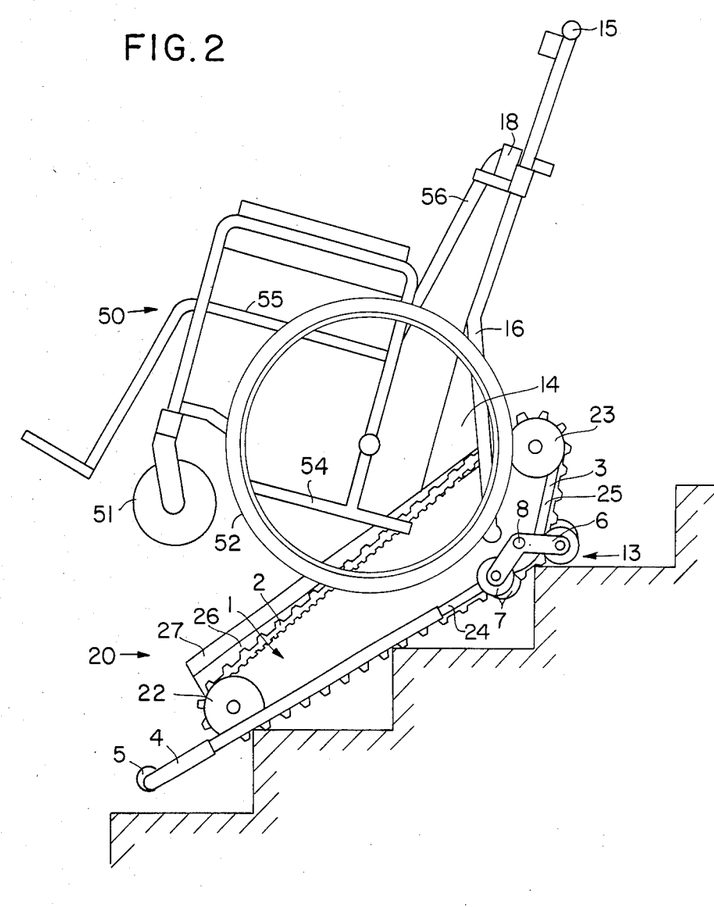
FIG. 2 shows a side view of the FIG. 1 vehicle while negotiating a stairway.
Figure 4:
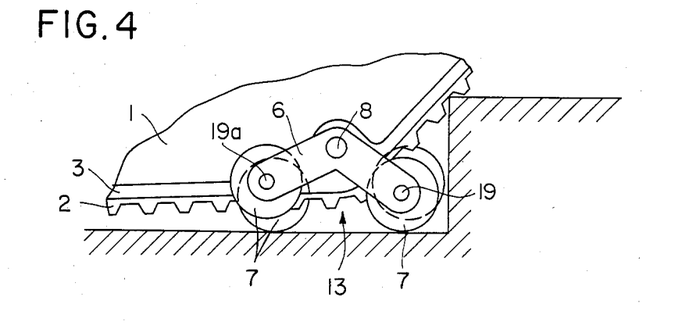
FIG. 4 shows a side view of the part of the vehicle carrying a roller assembly just prior to negotiating a stairway.

Also disposed at each side of the chassis structure is a track guide means as indicated generally at 3 for example in FIGS. 2 and 4. The guide means 3 tensions the respective track 2 which passes therearound, so that the track assumes the generally wedge-shaped configuration which is clearly visible, for example in FIG. 1, with the lower run of the track being supported by the guide means 3 along a rectilinear portion thereof. Thus, each guide means 3 comprises a rail 24 which extends along the side of the chassis structure 1, close to the bottom surface thereof, and a further rail 25 which is disposed at an angle of from approximately 130° to 150° with respect to the rail 24 and which also extends tangentially with respect to the wheel 23. The rail 25 thus forms an end portion on the guide means, which is bent upwardly towards the upper wheel 23 around which the track 2 passes.

The top surface of the chassis structure 1, as referred to above, is provided with a load-carrying platform 26, and carries fixing bars or rails as diagrammatically indicated at 27, such that a wheelchair adaptor or fitment member as indicated at 14 in FIG. 1 can be engaged therewith. The wheelchair adaptor member 14 comprises two spaced-apart rods or bars 16 which are provided at their one end, being the upper end in the position illustrated in FIG. 1, with handles 15 for guiding the wheelchair and being provided at their other end with brackets 17 for engaging under the large wheels 51 of the wheelchair. Also provided on the adaptor member 14 are securing means 18 which serve further to secure the wheelchair 50 in an inclined position on the vehicle 20, with its center of gravity at a suitable location in relation thereto, in order to prepare for negotiating steps or stairs.

Also provided on the chassis structure 1 are extension or cantilever arrangements indicated generally by reference numeral 4. Each arrangement 4 is disposed close to the bottom of the vehicle or the chassis structure 1 thereof, and is provided at its front or leading end, being the end which is towards the left in FIG. 1, with one or more support rollers 5.

Figure 3:
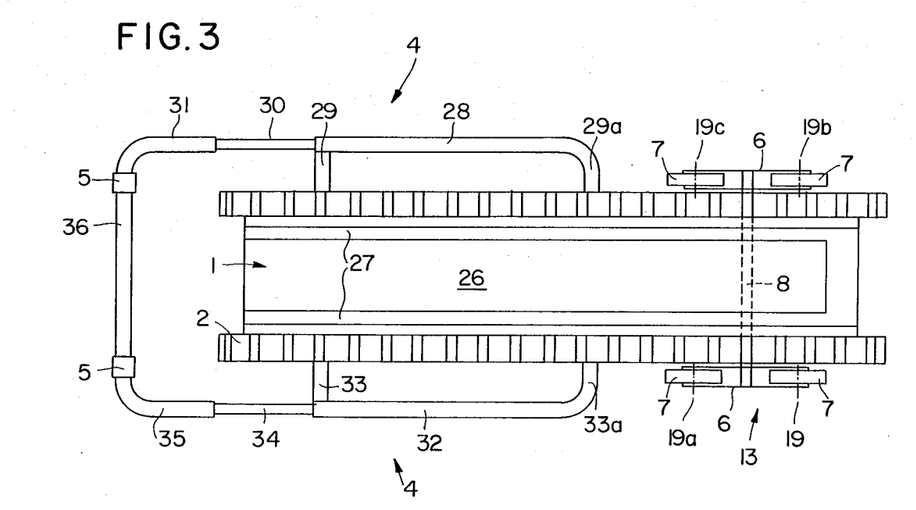
FIG. 3 shows a top plan view of the vehicle without the wheelchair or a wheelchair-adaptor or fixing member thereon.

Each extension or cantilever arrangement 4 comprises frame members such as rods or bars 28 through 31 and 32 through 35, respectively, which are arranged in two groups, as can be clearly seen from FIG. 3. Each such group includes members 28, 29, 29a and 32, 33 and a 33a respectively, which are fixedly mounted to the chassis structure 1, in combination with respective telescopic members 30 and 34 respectively, and connecting members 31 and 35 respectively, on which the support rollers 5, of which there are two illustrated in FIG. 3, are carried. The arrangements 4 thus constitute a generally square or rectangular frame structure which extends laterally from the chassis structure 1 at both sides thereof and also forwardly therefrom. The two arrangements 4 may be connected together by means of a coupling member as indicated at 36 at the front end thereof, but that member may be omitted if desired. The members 28, 30 and 32, 34 extend at least substantially parallel to the guide rails 24, but are disposed further outwardly from the chassis structure 1, as can be best seen from FIG. 3. That arrangement thus increases the overall base area of the chassis structure 1 and thus enhances its stability in the longitudinal direction and in the transverse directions when the extension arrangement 4 is of the configuration shown in FIG. 3, although the extension arrangement may be of such a configuration as to enhance stability of the vehicle in the longitudinal direction or in the transverse directions.

Figure 9:
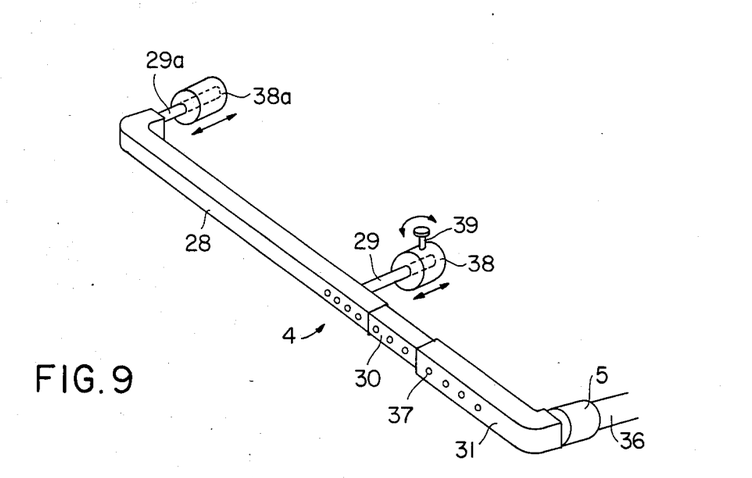
FIG. 9 shows a perspective view of a detail of a support arrangement of the vehicle.

At this point, reference will be made to FIG. 9 which shows a preferred form of the arrangement 4. As illustrated in FIG. 9, the members 28 and 30 comprise square or rectangular section tubes which are fitted telescopically one within the other end which can be locked relative to each other by means of a transverse pin 37 which is fitted through appropriate holes formed in the tube members 28 and 30. The members 29 and 29a each include a rod or bar and a sleeve or tubular member 38 and 38a respectively, which telescopically engage one into the other and which can be locked to one another utilizing the screw 39. Upon loosening the screw 39, it is possible to pull or push on the member 28 in order to vary the spacing of the tube members 28 and 30 from the chassis structure 1 in order to increase stability of the vehicle or to reduce the overall width of the vehicle, depending on the requirements of any particular situation. After adjusting the spacing of the members 28 and 30 relative to the chassis structure 1, the arrangement can be locked by tightening the screw 39.

Referring now again to FIG. 1, as referred to above, the guide means 3 for guiding the respective tracks 2 has a bend location at which the two rails 24 and 25 of the guide means 3 at each side of the chassis structure 1 meet. Disposed at that bend location is a roller assembly 13 comprising a spindle or shaft 8 which is rotatably mounted in the chassis structure 1, a double-armed lever 6 which is secured to the shaft 8 at each end thereof, and a pair of rollers 7 carried by each lever at or adjacent respective ends of the arms thereof. As will be seen from FIG. 1 and also FIG. 3, each lever 6 is disposed outside the casing or cladding of the chassis structure 1, and is also arranged somewhat outside the line of movement of the tracks 2, as is most clearly seen from FIG. 3. Each lever 6 is in the form of an inverted shallow V-shape, with the shaft 8 being connected thereto at the location of the point of the V-shape with the rollers 7 thus being disposed at a lower lever than the shaft 8.

As will be seen from FIG. 1, the rollers 7 project beyond the outside contour of the tracks 2. Therefore, when the vehicle is standing on a substantially horizontal or flat surface, the vehicle is essentially supported on the support rollers 5 and the rollers 7 of the roller assemblies 13. That position therefore is the position shown in FIG. 1, at the point where the vehicle is ready to begin to negotiate a set of steps or stairs.

Further details of the manner of mounting of the rollers 7 in the respective roller assemblies 13 will be described below.

Reference will now be made to FIG. 2 showing the vehicle with wheelchair thereon in a position of negotiating a flight of steps or stairs. The backrest of the wheelchair 50 faces in a direction upward of the stairs, irrespective of the direction in which the vehicle 20 is moving on the stairs. When the stairs are of medium steepness, the extension arrangement 4 remains in a retracted condition or is possibly not fitted to the chassis structure 1 as there is essentially no real need for it to be used in that situation. In contrast, when negotiating stairs which are of substantially greater steepness, or if the stability of the vehicle while moving is to be increased, the extension support arrangements 4 are fitted to the chassis structure by the members 29 and 29a as shown in FIG. 9 being fitted into corresponding locations on the chassis structure, for example the members 38 and 38a respectively, and being secured by tightening screw 39. In addition, the length of the arrangements 4 is adjusted to adapt it to the particular circumstances in question, by the telescopically adjustable members 28, 30 and 32, 34 being extended one from the other to a greater or lesser degree, and locked in the adjusted position. As will be appreciated, the enhanced stability of the vehicle, as afforded by the support arrangement 4, is purchased at the expense of a certain reduction in the degree of maneuverability of the vehicle in a horizontal plane, for which reason the extension arrangements 4 are only extended as far as necessary under the given circumstances. The appropriate information in that respect may be provided by a suitable instrument such as a protractor or clinometer instrument with suitable markings thereon.

Reference will now be made to FIGS. 3 through 6 for further details of the roller assembly 13. Carried at each end of the two arms of each double-armed lever or roller carrier member 6 is a respective roller 7, being mounted thereto by means of spindles 19, 19a, 19b and 19c respectively. The spindles 19 and 19b are not in alignment, but are arranged so as to be slightly offset relative to each other, and this is also true for the spindles 19a and 19c. To that purpose, the members 6 are rigidly fixed at the shaft 8 by a small angular displacement. This means that the spindles 19, 19c extend in a plane which is below the plane wherein the spindles 19a, 19b are arranged. When the vehicle is standing on flat surface, only one roller of the respective pair of rollers 7 is supported on the surface in question, as can be clearly seen for example from FIG. 4 which shows that the leading roller 7 of the nearer pair of rollers is raised from the ground surface while the trailing roller 7 of that pair is supported on the ground surface, while in regard to the other pair of rollers, the leading roller is on the ground surface and the trailing roller of that pair is raised. Therefore, the rollers which are actually supporting the vehicle 20 at that point are not disposed one behind the other, but are disposed in what might be called a diagonal or crossed relationship. That arrangement is found to be of advantage when maneuvering the vehicle, which is an aspect of particular significance for example when negotiating narrow landings between two successive flights of stairs. More particularly, the person using the vehicle 20, by pressing on the handles 15, can move the center of gravity of the vehicle towards the rearward rollers 7 and can then turn the vehicle without having to overcome such a high resistance as would otherwise be the case when using double rollers which are all in contact with the ground.

Figure 5:
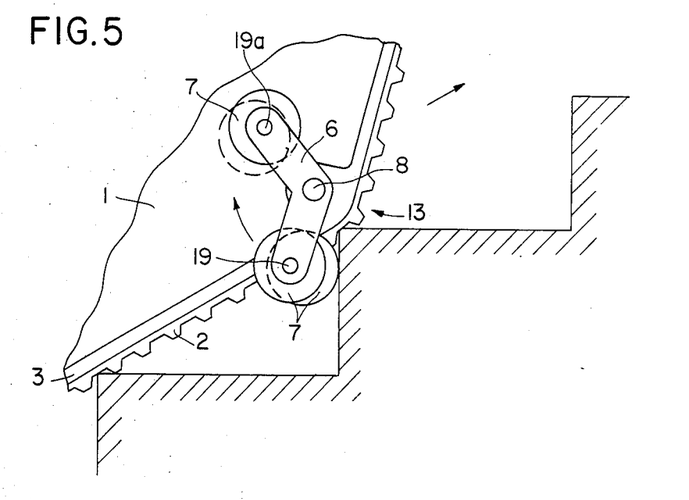
FIG. 5 shows a side view corresponding to the view shown in FIG. 4, illustrating the position assumed by the roller assembly while travelling up the stairway.
Figure 6:
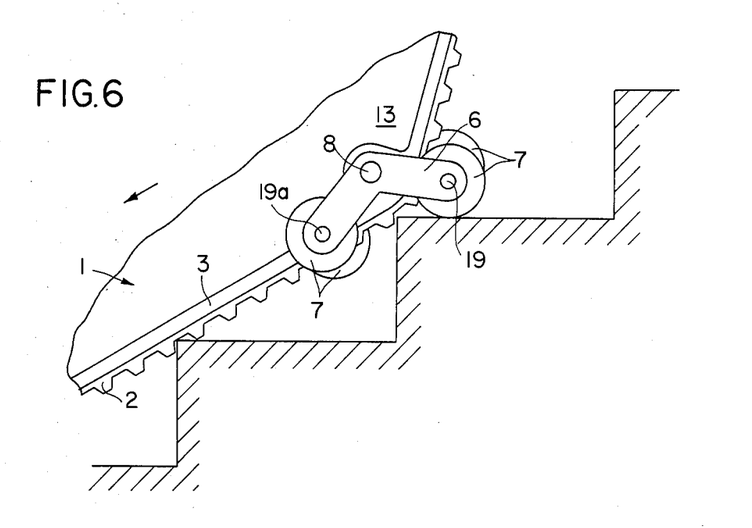
FIG. 6 is a view corresponding to the views of FIGS. 4 and 5 showing the position of the roller assembly when travelling down the stairway.

By virtue of the rollers 7 being disposed at the ends of the respective double-armed carrier levers 6, the rollers 7 are movable in such a way that they are deflected out of their ground-engaging position upon encountering the edge of a stair or step, as can best be seen from FIGS. 2, 5 and 6. When that occurs, the vehicle 20 is supported only on its tracks 2 and cannot be impeded by the rollers 7 jamming or bearing against the edge of a step or stair. That means that the roller assembly 13 does not impede the operation of negotiating stairs.

It will be clearly seen from the drawings that the levers 6 are of an angular configuration in side view, as mentioned above where reference is made to the levers 6 being of an inverted V-shape. It will be seen further that the two arms of each lever 6 extend downwardly. That means that, in conjunction with the shaft 8 being connected to the lever 6 at a higher position than the level of the spindles 19 through 19c on which the rollers 7 are carried, the rollers 7, due to the force of gravity acting thereon, have a tendency always to move into the position shown in FIG. 1 where they are lower than the level of the shaft 8. When accordingly, after negotiating steps, the vehicle comes to a landing or the like, as illustrated for example in FIG. 4 in regard to movement of the vehicle down a flight of stairs, the vehicle lands on the rollers 7 and can be easily moved and possibly turned, as already described above, without being driven by way of the tracks 2. In such operations, the front end at the support rollers 5 is lifted slightly from the surface on which the vehicle is standing, and therefore does not impede a turning maneuver.

Figure 7:
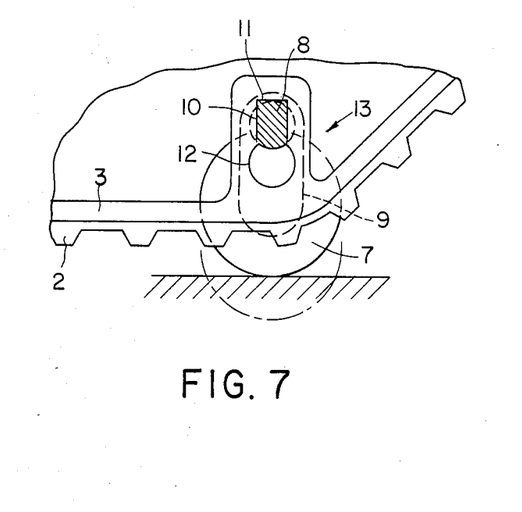
FIG. 7 shows a partly sectional side view of the part of the vehicle comprising a modified embodiment of the roller assembly having a single roller at each side of the vehicle chassis structure, with the roller assembly in a locked position for travel on a substantially horizontal surface.
Figure 8:
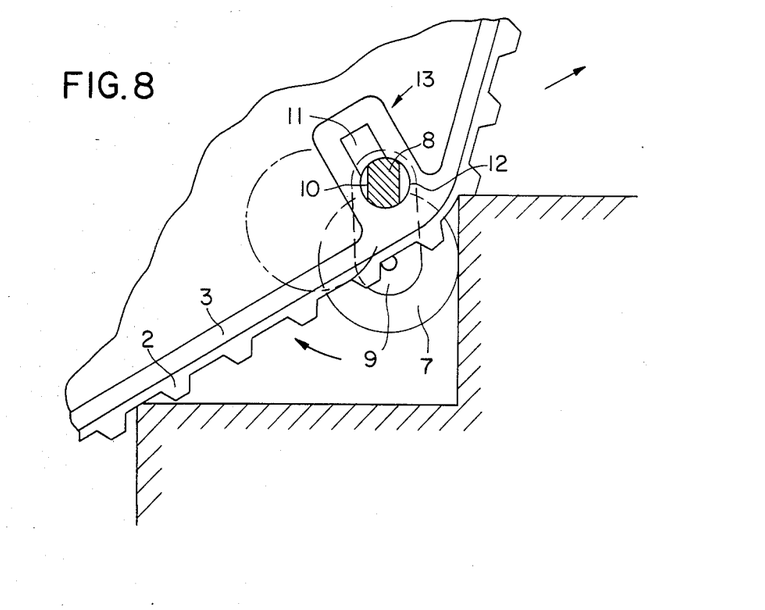
FIG. 8 shows a view corresponding to that shown in FIG. 7, but showing the roller assembly in the released position for negotiating stairs or steps.

Reference will now be made to FIGS. 7 and 8 illustrating a modified embodiment of the roller assembly which is indicated by reference numeral 13 in FIG. 1. Thus, in the form of the roller assembly shown in FIGS. 7 and 8, provided in the region of the bend location of the respective guide means 3, at each side of the chassis structure 1, is an opening 11 which is of the general configuration of a keyhole but in an inverted position, being defined therefore by a round opening portion and an opening portion having substantially straight sides and communicating with the round opening portion and being disposed thereabove. The shaft 8 is received in the openings 11 and at its ends has flattened portions 10 which are thus carried in the openings 11. The distance between the flat surfaces of the flattened end portions of the shaft 8 approximately corresponds to the distance between the straight sides of the straight-sided portion of the respective opening 11 so that when the shaft 8 is accommodated in the upper portion of the opening 11, as illustrated in FIG. 7, the shaft 8 is prevented from rotating relative to the chassis structure. When however the shaft 8 moves into the lower round portion as indicated at 12 of the opening 11, the shaft 8 is then free to rotate therein. That therefore is the position shown in FIG. 8.

Rigidly connected to the shaft 8 at each side of the chassis structure 1 is a respective roller carrier member 9, and carried on the roller carrier member 9 is a roller 7 or a pair of rollers.

When the roller 7 or the pair of rollers is put under a load, the shaft 8 is displaced upwardly in the respective openings 11 so that the flattened portions 10 thereof move into the straight-sided portion of the respective opening 11 until it reaches a position of abutting against the upward closed end of that portion of the opening, as illustrated in FIG. 7. The vehicle 20 can now be maneuvered on the rollers 7, as described above with reference to the embodiment of the roller assembly 13 as illustrated in FIGS. 1 through 6.

When the vehicle is required to negotiate stairs, the shaft 8 moves into the round portion 12 of the respective opening 11 so that the rollers 7 can be pivoted out of the way and do not impede negotiating the steps, as can be seen from FIG. 8 where the pivoted-away position of the rollers 7 is shown in broken lines. Moreover, although the rollers 7 are moved from the straight-sided portion of the opening 11 into the round portion 12 thereof by the force of gravity, that motion of the rollers can also be assisted by a spring force in order reliably to ensure that the roller assembly moves into the position shown, FIG. 8, when the rollers 7 are not required to support the vehicle.

It will be appreciated that various modifications and alterations may be made in the above-described vehicle structures without thereby departing from the spirit and scope of the present invention. For example, the arrangement 4 can be made of a single sheet of metal.

What is claimed is:

1. A step-negotiating vehicle for transporting a wheelchair, up or down a series of steps, said wheelchair having two axially aligned wheels and a user support structure, and said vehicle comprising:

a chassis having a bottom surface, a top surface and first and second sides wherein said chassis extends beneath the user support structure and between the axially aligned wheels of said wheelchair when said wheelchair is loaded upon said vehicle;

a track drive assembly on said chassis, said track drive assembly comprising power supply means, a motor powered by said power supply means, transmission means operatively connected to said motor, at least two drive rollers connected to said transmission means to be rotatively driven thereby, drive tracks mounted to said drive rollers to be driven thereby, and track guide means for guiding the drive tracks;

at least one extension means removably mounted to said chassis and extending from the sides of said chassis in proximal relation to said bottom surface and extending laterally from the sides of said chassis beyond the periphery of said chassis, said extension means providing additional lateral and longitudinal support for said chassis for enhanced stability of said vehicle; and roller means mounted to said chassis to support said vehicle when said vehicle is positioned on a flat surface.

2. The invention as defined in claim 1 wherein said roller means comprises a roller assembly mounted to said chassis and at least one support roller mounted to said extension means.

3. The invention as defined in claim 2 wherein said extension means is laterally and longitudinally extendable relative to said chassis.

4. The invention as defined in claim 3 wherein said support roller is mounted to the portion of the extension means which extends longitudinally relative to said chassis.

5. The invention as defined in claim 2 wherein said drive rollers, said drive tracks and said track guide means are mounted to both said first and second sides of said chassis.

6. The invention is defined in claim 5 wherein said track guide means mounted to said first and second sides of said chassis includes an angled portion wherein said roller assembly is mounted proximally to said angled portion of said track guide.

7. The invention as defined in claim 6 wherein said roller assembly comprises a mounting spindle extending through said chassis structure, a pair of carrier arms mounted to said spindle on each side of said chassis, and at least one roller rotatably mounted to each carrier arm wherein said carrier arms are angled and wherein said rollers are mounted to the ends of said carrier arms whereby said carrier arms are rotatably mounted to said spindle such that when said vehicle is negotiating a step said rollers and carrier arms deflect from their at rest position over the edge of the step.

8. The invention as defined in claim 7 wherein said rollers and carrier arms depend downwardly to their at rest position whereby said rollers extend below said drive tracks in order to support said vehicle on a flat surface.

9. The invention as defined in claim 8 wherein each said carrier arm carries at least two rollers.

10. The invention as defined in claim 9 wherein said carrier arms include two angled members each of said members carrying a roller thereon and wherein said carrier arms are mounted to said spindle at the point where said angled members are connected.

11. The invention as defined in claim 10 wherein said rollers are arranged in tandem relationship on said carrier arms and wherein said rollers are mounted to said carrier arms such that a first roller mounted to said carrier arm disposed on said first side of said chassis and a second roller mounted to said carrier arm disposed on said second side of said chassis, said first and second rollers disposed diagonally from each other, extend downwardly from said chassis structure further than the remaining tandem rollers when said carrier arms are in their position of supporting said vehicle wherein when one of said rollers of said tandem pair engages the ground, the other roller of said pair is spaced from the ground.

12. The invention as in claim 7 wherein said carrier arms are displaceable between a first position in which said carrier arms are pivotally movable and a second position in which said carrier arms are locked against pivotal movement.

13. The invention as defined in claim 7 wherein said mounting spindle rigidly interconnects said carrier arms, said spindle having flattened positions, said spindle disposed within mounting openings wherein said mounting openings having a round opening portion and a substantially rectangular portion with straight sides spaced apart a distance smaller than the diameter of said round opening portion with which said rectangular portion communicates, said rectangular portion of said opening disposed above said round opening portion, whereby when said spindle is disposed within said rectangular portion, said spindle is secured against rotary movement whereas when said spindle is disposed within said round portion, said spindle is free to rotate.

14. The invention as defined in claim 13 wherein said mounting spindle includes a resilient spring adapted to urge said spindle downwardly into said round opening portion of said mounting openings.

15. The invention as defined in claim 1 and further comprising means for securing a wheelchair on said chassis.

16. The invention as defined in claim 15 wherein said wheelchair securing means includes adapter means for retaining said wheelchair in an inclined position relative to said chassis.

17. A step-negotiating vehicle for transporting a load, comprising a wheelchair having two axially aligned wheels and a user support structure, up or down a series of steps, said vehicle comprising:
  a chassis having a bottom surface, a top surface and first and second sides wherein said chassis extends beneath the user support structure and between the axially aligned wheels of said wheelchair when wheelchair is loaded upon said vehicle;
  a track drive assembly on said chassis, said track drive assembly comprising power supply means, a motor adapted to be powered by said power supply means, transmission means operatively connected to said motor, at least two drive rollers connected to said transmission means and adapted to be rotatively driven thereby, drive tracks mounted to said drive rollers and adapted to be driven thereby, and track guide means for guiding the drive tracks;
  at least one extension means removably mounted to said chassis and extending from the sides of said chassis in proximal relation to said bottom surface wherein said extension means provides additional lateral and longitudinal support to said chassis for enhanced stability of said vehicle; and
  a roller assembly mounted to said chassis, said roller assembly having at least one roller mounted thereto wherein said roller assembly includes means for urging said assembly downwardly and wherein said roller assembly comprises means for pivotally moving said roller assembly when said roller assembly is in its downwardly dependent position and means for securing said roller assembly against pivotal movement when said roller assembly is disposed upwardly whereby said roller assembly is disposed upwardly by the force of said chassis on a flat surface.

18. The invention as defined in claim 17 and further comprising means for securing a wheelchair on said chassis.

19. A step-negotiating vehicle for transporting a wheelchair, up or down a series of steps, said wheelchair having two axially aligned wheels and a user support structure, and said vehicle comprising:
  a chassis having a bottom surface, a top surface and first and second sides wherein said chassis extends beneath the user support structure and between the axially aligned wheels of said wheelchair when said wheelchair is loaded upon said vehicle;
  a track drive assembly on said chassis, said track drive assembly comprising power supply means, a motor powered by said power supply means, transmission means operatively connected to said motor, at least two drive rollers connected to said transmission means to be rotatively driven thereby, drive tracks mounted to said drive rollers to be driven thereby, and track guide means for guiding the drive tracks;
  at least one extension means removably mounted to said chassis and extending from the sides of said chassis in proximal relation to said bottom surface, said extension means providing additional lateral and longitudinal support for said chassis enhanced stability of said vehicle; and
  roller means mounted to said chassis to support said vehicle when said vehicle is positioned on a flat surface;
  wherein said roller means comprises a roller assembly mounted to said chassis and at least one support roller mounted to said extension means, and wherein said extension means is laterally and longitudinally extendable relative to said chassis.

20. The invention as defined in claim 19 wherein said support roller is mounted to the portion of the extension means which extends longitudinally relatively to said chassis.

21. A step-negotiating vehicle for transporting a wheelchair, up or down a series of steps, said wheelchair having two axially aligned wheels and a user support structure, and said vehicle comprising:
  a chassis having a bottom surface, a top surface and first and second sides wherein said chassis extends beneath the user support structure and between the axially aligned wheels of said wheelchair when said wheelchair is loaded upon said vehicle;

a track drive assembly on said chassis, said track drive assembly comprising power supply means, a motor powered by said power supply means, transmission means operatively connected to said motor, at least two drive rollers connected to said transmission means to be rotatively driven thereby, drive tracks mounted to said drive rollers to be driven thereby, and track guide means for guiding the drive tracks;

at least one extension means removably mounted to said chassis and extending from the sides of said chassis in proximal relation to said bottom surface, said extension means providing additional lateral and longitudinal support for said chassis for enhanced stability of said vehicle; and roller means mounted to said chassis to support said vehicle when said vehicle is positioned on a flat surface;

wherein said roller means comprises a roller assembly mounted to said chassis and at least one support roller mounted to said extension means;

wherein said drive rollers, said drive tracks and said track guide means are mounted to both said first and second sides of said chassis;

wherein said track guide means mounted to said first and second sides of said chassis includes an angled portion wherein said roller assembly is mounted proximally to said angled portion of said track guide; and wherein said roller assembly comprises a mounting spindle extending through said chassis structure, a pair of carrier arms mounted to said spindle on each side of said chassis, and at least one roller rotatably mounted to each carrier arm wherein said carrier arms are angled and wherein said rollers are mounted to the ends of said carrier arms whereby said carrier arms are rotatably mounted to said spindle such that when said vehicle is negotiating a step said rollers and carrier arms deflect from their at rest position over the edge of the step.

22. The invention as defined in claim 21 wherein said rollers and carrier arms depend downwardly to their at rest position whereby said rollers extend below said drive tracks in order to support said vehicle on a flat surface.

23. The invention as defined in claim 22 wherein each said carrier arm carries at least two rollers.

24. The invention as defined in claim 23 wherein said carrier arms include two angled members each of said members carrying a roller thereon and wherein said carrier arms are mounted to said spindle at the point where said angled members are connected.

25. The invention as defined in claim 24 wherein said rollers are arranged in tandem relationship on said carrier arms and wherein said rollers are mounted to said carrier arms such that a first roller mounted to said carrier arm disposed on said first side of said chassis and a second roller mounted to said carrier arm disposed on said second side of said chassis, said first and second rollers disposed diagonally from each other, extend downwardly from said chassis structure further than the remaining tandem rollers when said carrier arms are in their position of supporting said vehicle wherein when one of said rollers of said tandem pair engages the ground, the other roller of said pair is spaced from the ground.

26. The invention as in claim 21 wherein said carrier arms are displaceable between a first position in which said carrier arms are pivotally movable and a second position in which said carrier arms are locked against pivotal movement.

27. The invention as defined in claim 21 wherein said mounting spindle rigidly interconnects said carrier arms, said spindle having flattened positions, said spindle disposed within mounting openings wherein said mounting openings having a round opening portion and a substantially rectangular portion with straight sides spaced apart a distance smaller than the diameter of said round opening portion with which said rectangular portion communicates, said rectangular portion of said opening disposed above said round opening portion, whereby when said spindle is disposed within said rectangular portion, said spindle is secured against rotary movement whereas when said spindle is disposed within said round portion, said spindle is free to rotate.

28. The invention as defined in claim 27 wherein said mounting spindle includes a resilient spring adapted to urge said spindle downwardly into said round opening portion of said mounting openings.

29. The invention as defined in claim 21 and further comprising means for securing a wheelchair on said chassis.

30. The invention as defined in claim 29 wherein said wheelchair securing means includes means for retaining said wheelchair in an inclined position relative to said chassis.

* * * * *

UNITED STATES PATENT AND TRADEMARK OFFICE
CERTIFICATE OF CORRECTION

PATENT NO. : 4,627,508

DATED : 12/9/86

INVENTOR(S) : Peter Auer

It is certified that error appears in the above-identified patent and that said Letters Patent is hereby corrected as shown below:

Col. 5, line 47, change "4,401,178" to --4.410,178--.

Col. 6, line 42 after "arrangements", add --as--.

Col. 7, line 45, change "lever" to --level--.

Signed and Sealed this

Twelfth Day of January, 1988

Attest:

DONALD J. QUIGG

Attesting Officer

Commissioner of Patents and Trademarks